United States Patent
Higano et al.

(10) Patent No.: US 10,502,993 B2
(45) Date of Patent: Dec. 10, 2019

(54) DISPLAY DEVICE

(71) Applicant: JAPAN DISPLAY INC., Minato-ku (JP)

(72) Inventors: Emi Higano, Tokyo (JP); Toshiyuki Higano, Tokyo (JP)

(73) Assignee: JAPAN DISPLAY INC., Minato-ku (JP)

( * ) Notice: Subject to any disclaimer, the term of this patent is extended or adjusted under 35 U.S.C. 154(b) by 0 days.

(21) Appl. No.: 16/121,985

(22) Filed: Sep. 5, 2018

(65) Prior Publication Data

US 2019/0072811 A1 Mar. 7, 2019

(30) Foreign Application Priority Data

Sep. 5, 2017 (JP) .................. 2017-170541

(51) Int. Cl.
| | |
|---|---|
| *G02F 1/1333* | (2006.01) |
| *G02F 1/1339* | (2006.01) |
| *G02F 1/1337* | (2006.01) |
| *G02F 1/1335* | (2006.01) |
| *G02F 1/1343* | (2006.01) |
| *F21V 8/00* | (2006.01) |

(52) U.S. Cl.
CPC ..... *G02F 1/133308* (2013.01); *G02B 6/0056* (2013.01); *G02F 1/1337* (2013.01); *G02F 1/1339* (2013.01); *G02F 1/133305* (2013.01); *G02F 1/133345* (2013.01); *G02F 1/133512* (2013.01); *G02F 1/133514* (2013.01); *G02F 1/133615* (2013.01); *G02F 1/134309* (2013.01); *G02F 1/133536* (2013.01); *G02F 1/133553* (2013.01); *G02F 2001/133519* (2013.01)

(58) Field of Classification Search
CPC ......... G02F 1/133536; G02F 1/133528; G02F 1/133615; G02F 1/133512; G02F 1/133305; G02F 1/133345; G02F 1/134309; G02F 1/133553
See application file for complete search history.

(56) References Cited

U.S. PATENT DOCUMENTS

2014/0253845 A1   9/2014   Shibata

FOREIGN PATENT DOCUMENTS

JP   2014-170159 A   9/2014

*Primary Examiner* — Phu Vu
(74) *Attorney, Agent, or Firm* — Oblon, McClelland, Maier & Neustadt, L.L.P.

(57) ABSTRACT

According to one embodiment, a display device comprises a light source, a light guide, a flexible display panel, and a first polarizer. The light guide includes first and second surfaces and a side surface. The flexible display panel includes a display area on which the light from the first surface is incident. The first polarizer is disposed between the light guide and the display panel. The display panel is opposed to the first surface. An end portion of the display panel is bent toward the second surface along the side surface. The first polarizer faces the side surface.

20 Claims, 7 Drawing Sheets

DISPLAY DEVICE

CROSS-REFERENCE TO RELATED APPLICATIONS

This application is based upon and claims the benefit of priority from Japanese Patent Application No. 2017-170541, filed Sep. 5, 2017, the entire contents of which are incorporated herein by reference.

FIELD

Embodiments described herein relate generally to a display device.

BACKGROUND

A display device such as a liquid crystal display device comprises, for example, a backlight and a display panel which displays images with light from the backlight. The backlight comprises a light source and a light guide which guides light from the light guide and urges the light to be emitted from an upper surface opposed to the display panel.

The light guide is accommodated in a frame which covers its back surface and side surfaces. The frame does not only support the light guide, but plays a role of reflecting part of the light emitted from the side surfaces of the light guide and returning the light to the light guide, and blocking the light to prevent light leakage to the outside of the light guide.

In the display device having such a configuration, a frame area of the display device extends in accordance with the thickness of the frame which covers the side surfaces. In contrast, if the frame which covers the side surfaces is removed, the light use efficiency of the backlight may be lowered, light may leak to the outside, and the quality of the display device may be degraded. For this reason removing the frame which covers the side surfaces is difficult.

DETAILED DESCRIPTION

In general, according to one embodiment, a display device, comprises a light source, a light guide, a flexible display panel, and a first polarizer. The light guide includes a first surface, a second surface opposed to the first surface, and a side surface connecting the first surface and the second surface, and allowing light from the light source to be emitted from the first surface. The flexible display panel includes a display area on which the light from the first surface is incident. The first polarizer is disposed between the light guide and the display panel. The display panel is opposed to the first surface. An end portion of the display panel is bent toward the second surface along the side surface. The first polarizer faces the side surface.

According to another embodiment, a display device, comprises a light source, a light guide, a flexible display panel, and a reflective member. The light guide includes a first surface, a second surface opposed to the first surface, and a side surface connecting the first surface and the second surface, and allowing light from the light source to be emitted from the first surface. The flexible display panel includes a display area on which the light from the first surface is incident. The reflective member faces the side surface. The display panel is bent along the side surface. The reflective member is located between the display panel and the side surface, in an area where the display panel is bent. A total of a thickness of the display panel and a thickness of the reflective member in the area where the display panel is bent is smaller than or equal to a thickness of the display panel in the display area.

Embodiments will be described hereinafter with reference to the accompanying drawings.

The disclosure is merely an example, and proper changes within the spirit of the invention, which are easily conceivable by a skilled person, are included in the scope of the present invention as a matter of course. In addition, in some cases, in order to make the description clearer, the drawings may be more schematic than in the actual modes, but they are mere examples, and do not limit the interpretation of the present invention. In the drawings, the reference numbers of the same or similar elements that are successively arranged may be omitted. In the specification and the drawings, structural elements performing the same functions as or similar functions to those already described will be given the same reference numbers, and overlapping detailed descriptions may be omitted.

In the embodiments, a liquid crystal display device is disclosed as an example of the display device. However, each embodiment does not prevent application of individual technical ideas disclosed in the embodiment to the other types of display devices.

First Embodiment

Figure 1:
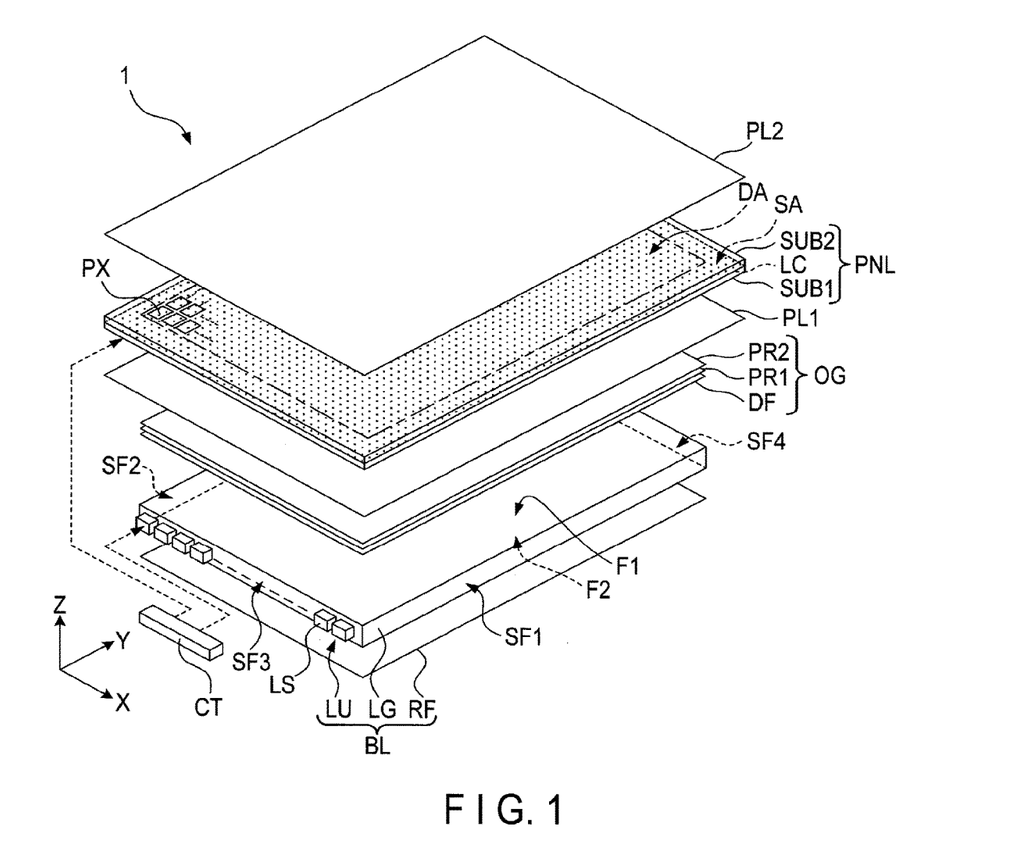
FIG. 1 is an exploded perspective view schematically showing a configuration example of a display device according to a first embodiment.

FIG. 1 is an exploded perspective view schematically showing a configuration example of a display device 1. The display device 1 comprises a backlight BL and a display panel PNL. The first direction X, the second direction Y, and the third direction Z are defined as shown in the drawing. The directions X, Y, and Z are orthogonal to each other in the present embodiment, but may intersect at an angle other than 90 degrees. In the present disclosure, a direction indicated by an arrow of the third direction Z is referred to as "above/over", and an opposite direction of the arrow is referred to as "under/below".

In the example shown in FIG. 1, the backlight BL is a side-edge type backlight comprising a light source unit LU, a light guide LG, and a reflective member RF. However, the configuration of the backlight BL is not limited to the example shown in FIG. 1, but may be configured to supply light necessary for image display.

In the example shown in FIG. 1, the display panel PNL and the light guide LG are formed in a rectangular shape having shorter sides in the first direction X and longer sides in the second direction Y. The shape of the display panel PNL and the light guide LG is not limited to a rectangle but may be the other shape.

The light guide LG includes a first main surface F1 and a second main surface F2 located opposite to the first main surface F1. Furthermore, the light guide LG includes a first side surface SF1, a second side surface SF2, a third side surface SF3, and a fourth side surface SF4, which connect the first main surface F1 and the second main surface F2. The first side surface SF1 and the second side surface SF2 are parallel to the second direction Y while the third side surface SF3 and the fourth side surface SF4 are parallel to the first direction X.

The light source unit LU comprises light sources LS arranged along the third side surface SF3 in the first direction X. The light sources LS are, for example, light-emitting diodes but may be the other type of light-emitting elements such as organic electroluminescent devices. The reflective member RF faces the second main surface F2. For example, the reflective member RF includes a layer formed of a metal material having an excellent reflectivity such as silver or aluminum.

Light from the light sources LS are made incident on the light guide LG from the third side surface SF3. The light guide LG guides the light incident from the third side surface SF3 and emits the light mainly from the first main surface F1. Light can also be emitted from the second main surface F2 but the light is reflected on the reflective member RF and returned to the light guide LG.

The display panel PNL is a transmissive liquid crystal panel, and comprises a first substrate SUB1, a second substrate SUB2 opposed to the first substrate SUB1, and a liquid crystal layer LC sealed between the first substrate SUB1 and the second substrate SUB2. The display panel PNL includes a display area DA including pixels PX, and a peripheral area SA around the display area DA. The pixels PX are arrayed in a matrix in the first direction X and the second direction Y. The display area DA is opposed to the first main surface F1 of the light guide LG. For example, the shape of the display area DA matches the shape of the first main surface F1.

The display device 1 further comprises an optical sheet group OG, a first polarizer PL1, a second polarizer PL2, and a controller CT. The optical sheet group OG includes, for example, a diffusion sheet DF which diffuses the light from the first main surface F1, and a first prism sheet PR1 and a second prism sheet PR2 in which a number of prism lenses are formed. However, the configuration of the optical sheet group OG is not limited to this.

The first polarizer PL1 is disposed on the optical sheet group OG and the first substrate SUB1. The second polarizer PL2 is disposed above the second substrate SUB2. That is, the display panel PNL is disposed between the first polarizer PL1 and the second polarizer PL2. Axes of polarization of the first polarizer PL1 and the second polarizer PL2 are orthogonal to each other.

The controller CT controls the display panel PNL and the light source unit LU. For example, the controller CT can be composed of the IC and various types of circuit devices. The controller CT may be composed of the IC which controls the display panel PNL and the IC which controls the light source unit LU. In this case, the ICs may be disposed at positions remote from each other.

Figure 2:
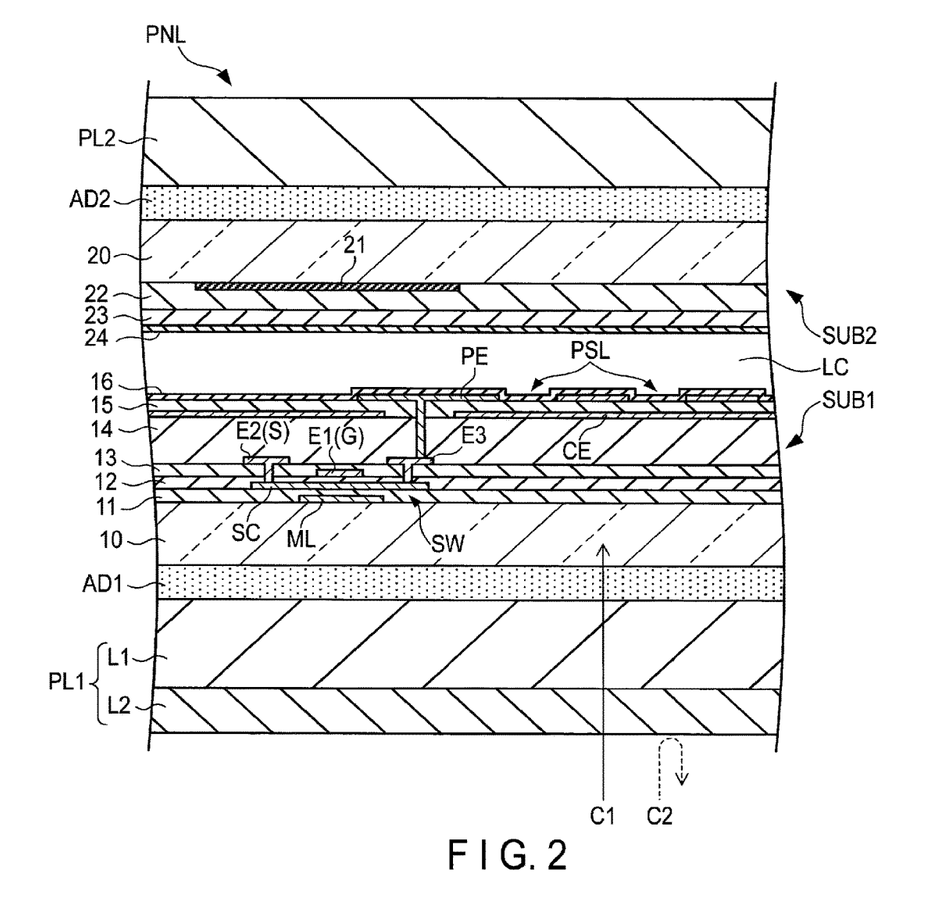
FIG. 2 is a schematic cross-sectional view showing a display device according to the first embodiment in a display area.

FIG. 2 is a schematic cross-sectional view showing the display device 1 in the display area DA. Illustration of the backlight BL and the optical sheet group OG is omitted.

The first substrate SUB1 comprises a first insulating base 10, insulating layers 11 to 15, a first alignment film 16, a switching element SW, a pixel electrode PE, a common electrode CE, and a metal layer ML. The switching element SW comprises a semiconductor layer SC, a first electrode E1, a second electrode E2, and a third electrode E3.

The metal layer ML is disposed on an upper surface of the first insulating base 10. An insulating layer may be interposed between the metal layer ML and the first insulating base 10. The insulating layer 11 covers the upper surfaces of the metal layer ML and the first insulating base 10. The semiconductor layer SC is disposed on the first insulating layer 11. The insulating layer 12 covers the semiconductor layer SC and the insulating layer 11. The first electrode E1 is disposed on the insulating layer 12. The insulating layer 13 covers the first electrode E1 and the insulating layer 12. The second electrode E2 and the third electrode E3 are disposed on the insulating layer 13. The insulating layer 14 covers the second electrode E2, the third electrode E3, and the insulating layer 13. The common electrode CE is disposed on the insulating layer 14. The insulating layer 15 covers the common electrode CE. The pixel electrodes PE are formed on the third insulating layer 13. The first alignment film 16 covers the pixel electrode PE and the insulating layer 15.

The first electrode E1 is, for example, a part of the scanning line G to which a scanning signal is supplied, and is in contact with the semiconductor layer SC through a contact hole which penetrates the insulating layers 12 and 13. The second electrode E2 is, for example, a part of the signal line S to which a video signal is supplied, and is in contact with the semiconductor layer SC through a contact hole which penetrates the insulating layers 12 and 13.

The metal layer ML is located just under an area where the first electrode E1 and the semiconductor layer SC are opposed to each other. The metal layer ML is formed of a metal material having a high reflectivity and an excellent light shielding property, such as aluminum or an aluminum alloy. When the light from the backlight BL is made incident on a part of the semiconductor layer SC opposed to the first electrode E1, a leak current may occur at the switching element SW. The metal layer ML blocks (reflects) the light from the backlight BL and prevents occurrence of the leak current.

The pixel electrodes PE and the common electrodes CE are formed of, for example, a transparent conductive material such as indium tin oxide (ITO). In the example illustrated, the pixel electrode PE comprises slits PSL. However, the pixel electrode PE may not include the slits PSL.

The second substrate SUB2 comprises a second insulating base 20, a light-shielding layer 21, a color filter 22, an overcoat layer 23, and a second alignment film 24. The light-shielding layer 21 is disposed on a lower surface of the second insulating base 20 and is opposed to the first electrode E1 (scanning line G), the second electrode E2 (signal line S), the third electrode E3, and the metal layer ML. The color filter 22 covers the lower surfaces of the light-shielding layer 21 and the second insulating base 20. The overcoat layer 23 covers the color filter 22. The second alignment film 24 covers the overcoat layer 23. The liquid crystal layer LC is located between the first alignment film 16 and the second alignment film 24.

The above-explained structure of the display panel PNL is a mere example, and various structures can be applied to the display panel PNL. For example, the common electrode CE may be provided on the second substrate SUB2. In addition, the common electrode CE may be disposed between the liquid crystal layer LC and the pixel electrode PE.

The first polarizer PL1 is stuck on the lower surface of the first insulating base 10 by a first adhesive layer AD1. The second polarizer PL2 is stuck on the upper surface of the second insulating base 20 by a second adhesive layer AD2.

The first polarizer PL1 is what is called a reflective polarizer and includes a first layer L1 and a second layer L2. The first layer L1 is located between the second layer L2 and the first adhesive layer AD1. An adhesive layer to stick the first layer L1 and the second layer L2 may be interposed between these layers. The first layer L1 comprises a polarizer which urges a first polarization component C1 (for example, P wave) of the light from the backlight BL to be transmitted and which absorbs a second polarization component C2 (for example, S wave) of the light. The second layer L2 urges a first polarization component C1 of the light from the backlight BL to be transmitted and reflects the second polarization component C2. The light reflected by the second layer L2 is reflected on, for example, the reflective member RF shown in FIG. 1 and returns to the second layer L2. The reflection is repeated between the second layer L2 and the reflective member RF, and then the light of the second polarization component C2 is converted into the light of the first polarization component C1 and transmitted through the second layer L2. Thus, the second polarization component of the light from the backlight BL is reused by the second layer L2 and the luminance of the light incident on the display panel PNL is increased.

The first insulating base 10 and the second insulating base 20 are formed of, for example, a resin material such as polyimide, polyester or polycarbonate. The first insulating base 10 and the second insulating base 20 thereby have flexibility. Furthermore, the display panel PNL also has flexibility. The display panel PNL is bent along the first side surface SF1 to the fourth side surface SF4 of the light guide LG shown in FIG. 1. However, the display panel PNL may be bent along at least one of the first side surface SF1 to the fourth side surface SF4 and may not be bent in close vicinity to any one of the side surfaces.

Figure 3:
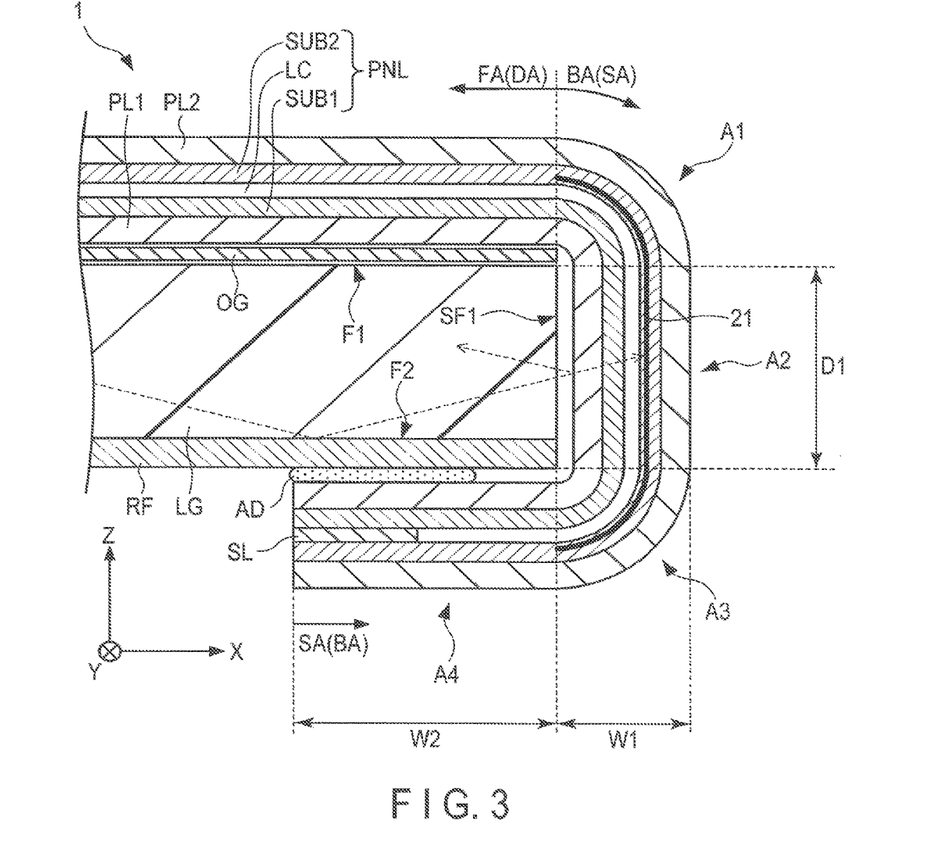
FIG. 3 is a schematic cross-sectional view showing the display device according to the first embodiment, in close vicinity to the side surfaces of the light guide.

FIG. 3 is a schematic cross-sectional view showing the display device 1 in close vicinity to the first side surface SF1. In the example shown in the drawing, the display panel PNL, the first polarizer PL1, and the second polarizer PL2 are bent along the first side surface SF1. Tips of the display panel PNL, the first polarizer PL1, and the second polarizer PL2 are located on the side of the second main surface F2 of the light guide LG.

More specifically, the display panel PNL, the first polarizer PL1, and the second polarizer PL2 have a flat area FA parallel to the first main surface F1 of the light guide LG, and a bent area BA which is bent from the flat area FA. A boundary between the flat area FA and the bent area BA, i.e., a position at which the first polarizer PL1 and the second polarizer PL2 start making a curvature matches, for example, the first side surface SF1 in the first direction X. However, the boundary may be located on an inner side (left side in the drawing) from the first side surface SF1 or an outer side (right side in the drawing) from the first side surface SF1.

The flat area FA matches, for example, the display area DA. In this case, the bent area BA matches the peripheral area SA. However, the display area DA may extend to the bent area BA or the peripheral area SA may extend to the flat area FA.

The bent area BA includes a first area A1, a second area A2, a third area A3, and a fourth area A4. The second area A2 is opposed to the first side surface SF1. The fourth area A4 is opposed to the reflective member RF. The first area A1 corresponds to a corner portion composed of the first main surface F1 and the first side surface SF1, and is located between the flat area FA and the second area A2. The third area A3 corresponds to a corner portion composed of the second main surface F2 and the first side surface SF1, and is located between the second area A2 and the fourth area A4.

In the figure, a width w1 of the peripheral area SA is a width of the peripheral area in a case where the surface (flat area FA) formed by the display area DA is seen in a planar view. A length from the boundary between the peripheral area SA and the display area DA to the end portion is a length of extension of the first area A1, the second area A2, the third area A3, and the fourth area A4, but the width w1 in a case where the peripheral area SA is seen in a planar view is much shorter than the length of the extension by curbing the peripheral area SA along the first side surface SF1. An outer periphery of each of the first area A1 and the third area A3 is a quarter of a periphery of a circle having a radius equal to the width w1, and the width w1 is shorter than the outer periphery of each of the first area A1 and the third area A3.

In addition, if each of the first area A1 and the third area A3 is formed in a fan shape which is a quarter of a circle having a radius equal to the width w1, the width w1 is equivalent to the distance from the first main surface F1 of the light guide LG in the display area DA to the outer surface of the second polarizer PL2 and, furthermore, equivalent to the distance from the back surface of the reflective member RF in the fourth area A4 to the outer surface of the second polarizer PL2.

In the present specification, a length in a direction orthogonal to the side forming the display area DA is called a width, when a plane formed by the display area DA is seen in a planar view.

In the example shown in FIG. 3, the second area A2 and the fourth area A4 are flat while each of the first area A1 and the third area A3 has a curvature. However, each of the second area A2 and the fourth area A4 may have a curvature. For example, the display panel PNL, the first polarizer PL1, and the second polarizer PL2 may be bent in an arcuate shape along the first area A1, the second area A2, and the third area A3.

In the fourth area A4, the end portion of the first polarizer PL1 is stuck to the reflective member RF by an adhesive AD. The tips of the display panel PNL, the first polarizer PL1, and the second polarizer PL2 may be set as free ends without providing the adhesive AD.

The first substrate SUB1 and the second substrate SUB2 are bonded by a frame-shaped sealing member SL provided in the peripheral area SA. The liquid crystal layer LC is sealed in space surrounded by the first substrate SUB1, the second substrate SUB2, and the sealing member SL. In the example shown in FIG. 3, the sealing member SL is located in the fourth area A4. That is, the sealing member SL is located on the reflective member RF side. The sealing member SL may extend to not only the fourth area A4, but to the third area A3, the second area A2, or the first area A1.

In the second area A2, the first polarizer PL1 faces the first side surface SF1. In the example shown in FIG. 3, the gap is interposed between the first side surface SF1 and the first polarizer PL1, but the first side surface SF1 and the first polarizer PL1 may be in close contact with each other.

The light-shielding layer 21 shown in FIG. 2 may be provided in not only the display area DA, but the peripheral area SA. More specifically, the light-shielding layer 21 is provided in the first area A1, the second area A2, and the third area A3. In the example shown in FIG. 3, the light-shielding layer 21 is not provided in the fourth area A4. However, the light-shielding layer 21 may be provided in the fourth area A4.

As represented by a broken line in FIG. 3, part of the light guided by the light guide LG and emitted from the first side surface SF1 is reflected on the first polarizer PL1 and made incident on the light guide LG again. The use efficiency of the light of the backlight BL is thereby improved. The light which is not reflected is transmitted through the first polarizer PL1 but absorbed into the light-shielding layer 21. For this reason, the light of the backlight BL does not leak to the outside in the bent area BA.

As shown in FIG. 2, if the first polarizer PL1 comprises the second layer L2, the second layer L2 faces the first side surface SF1. The second polarization component C2 of the light emitted from the first side surface SF1 is reflected on the second layer L2. The first polarization component C1 of the light is transmitted through the second layer L2 and the first layer L and is absorbed into the light-shielding layer 21.

Figure 4:
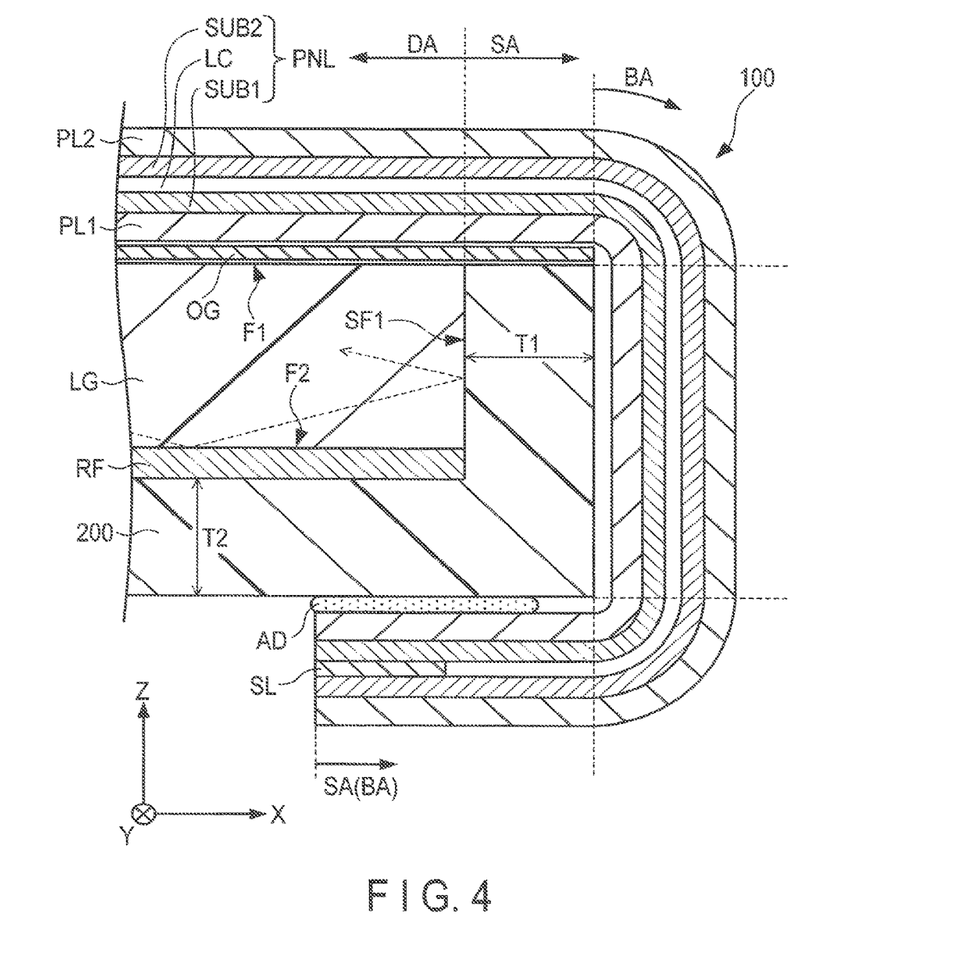
FIG. 4 is a schematic cross-sectional view showing a display device according to a comparative example.

FIG. 4 is a schematic cross-sectional view showing a display device 100 according to a comparative example of the present embodiment. The display device 100 comprises a frame 200 shaped in a casing which accommodates the light guide LG and the reflective member RF. The frame 200 is formed of, for example, a white resin material. The frame 200 covers the lower surface of the reflective member RF and the first side surface SF1 of the light guide LG. The display panel PNL, the first polarizer PL1, and the second polarizer PL2 are bent similarly to the example shown in FIG. 3. The tips of the display panel PNL, the first polarizer PL1, and the second polarizer PL2 are bonded to the lower surface of the frame 200 via the adhesive AD.

As represented by a broken line in FIG. 4, part of the light guided by the light guide LG and emitted from the first side surface SF1 is reflected on the frame 200. Part of the remainder is absorbed into the frame 200.

In the structure of the present embodiment shown in FIG. 3, the thickness of the display panel PNL, the first polarizer PL1, and the second polarizer PL2, which are located on the right side of the first side surface SF1, is substantially equal to the width w1 of the frame area (non-display area) of the display device 1. In contrast, in the structure of the comparative example, the width of the frame area is larger than that in the present embodiment by thickness T1 of the frame 200 which faces the first side surface SF1. That is, in the structure of the present embodiment, narrowing the frame can be implemented since the frame 200 which faces the first side surface SF1 is not provided. Furthermore, in the present embodiment, the display device 1 can be thinned by thickness T2 of the frame 200 which faces the reflective member RF in the comparative example.

In the comparative example, the frame 200 comprises a reflection function of reflecting part of the light emitted from the first side surface SF1 and a light-shielding function of absorbing part of the remainder. In the present embodiment, the reflection function and the light-shielding function are implemented by the first polarizer PL1 and the light-shielding layer 21.

Furthermore, in the present embodiment, the light guide LG and the reflective member RF are held by bonding the tips of the display panel PNL, the first polarizer PL1, and the second polarizer PL2 on the lower surface of the reflective member RF.

The same structure as that shown in FIG. 3 can also be applied to the close vicinity to the second side surface SF2 and the fourth side surface SF4. At the position in close vicinity to the third side surface SF3, for example, the display panel PNL, the first polarizer PL1, and the second polarizer PL2 may be curbed along the outside of the light source unit LU and their tips may be bonded to the lower surface of the reflective member RF. Thus, the light source unit LU can be held by the display panel PNL, the first polarizer PL1, and the second polarizer PL2. However, a frame may be provided in close vicinity to the third side surface SF3, and the light source unit LU may be held together with the light guide LG by the frame.

In the structure of the present embodiment shown in FIG. 3, a part of the bent area BA is located under the light guide LG and the reflective member RF, but the width w1 of the frame area (non-display area) is smaller than the width w2 of the fourth area A4 from the end portion of the light guide LG or the reflective member RF to the end portion of the display panel PNL or the first polarizer PL1 and the second polarizer PL2 (i.e., the width of the bent area BA located on the back surface of the light guide LG). In addition, the width w1 of the frame area (non-display area) is also smaller than the thickness D1 of the light guide LG and the reflective member RF.

Furthermore, in the structure of the present embodiment shown in FIG. 3, although the frame comprises the reflection function of reflecting part of the light emitted from the first side surface SF1 and the light-shielding function of absorbing part of the remainder, similarly to the frame 200 shown in FIG. 4, the width w1 of the frame area (non-display area) is equivalent to the thickness of the display panel PNL in the display area DA.

Second Embodiment

A second embodiment will be described. Constituent elements and effects that are not specifically referred to are the same as those in the first embodiment.

Figure 5:
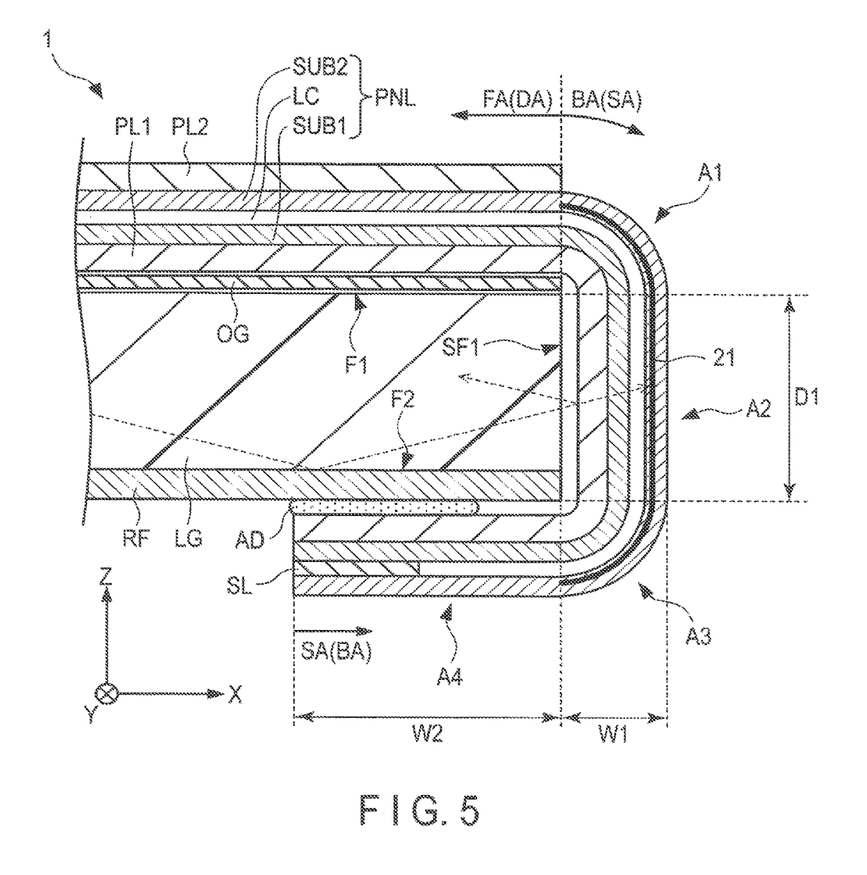
FIG. 5 is a schematic cross-sectional view showing a display device according to a second embodiment.

FIG. 5 is a schematic cross-sectional view showing a display device 1 according to a second embodiment. Attention is focused on a close vicinity to a first side surface SF1 of a light guide LG, similarly to FIG. 3.

In the example of FIG. 5, a second polarizer PL2 is not provided in a bent area BA. An end portion of the second polarizer PL2 is located at, for example, a boundary between a flat area FA and the bent area BA. The end portion of the second polarizer PL2 may be located on an inner side from the boundary (left side in the figure) or may extend to a first area A1. The same structure as that shown in FIG. 5 can also be applied to a close vicinity to a second side surface SF2, a third side surface SF3, and a fourth side surface SF4 of the light guide LG.

According to the structure of the present embodiment, the frame of the display device 1 can be narrowed by thickness of the second polarizer PL2, as compared with the first embodiment. Furthermore, according to the structure of the present embodiment, the display device 1 can be thinned by thickness of the second polarizer PL2, as compared with the first embodiment.

Third Embodiment

A third embodiment will be described. Constituent elements and effects that are not specifically referred to are the same as those in the first embodiment.

Figure 6:
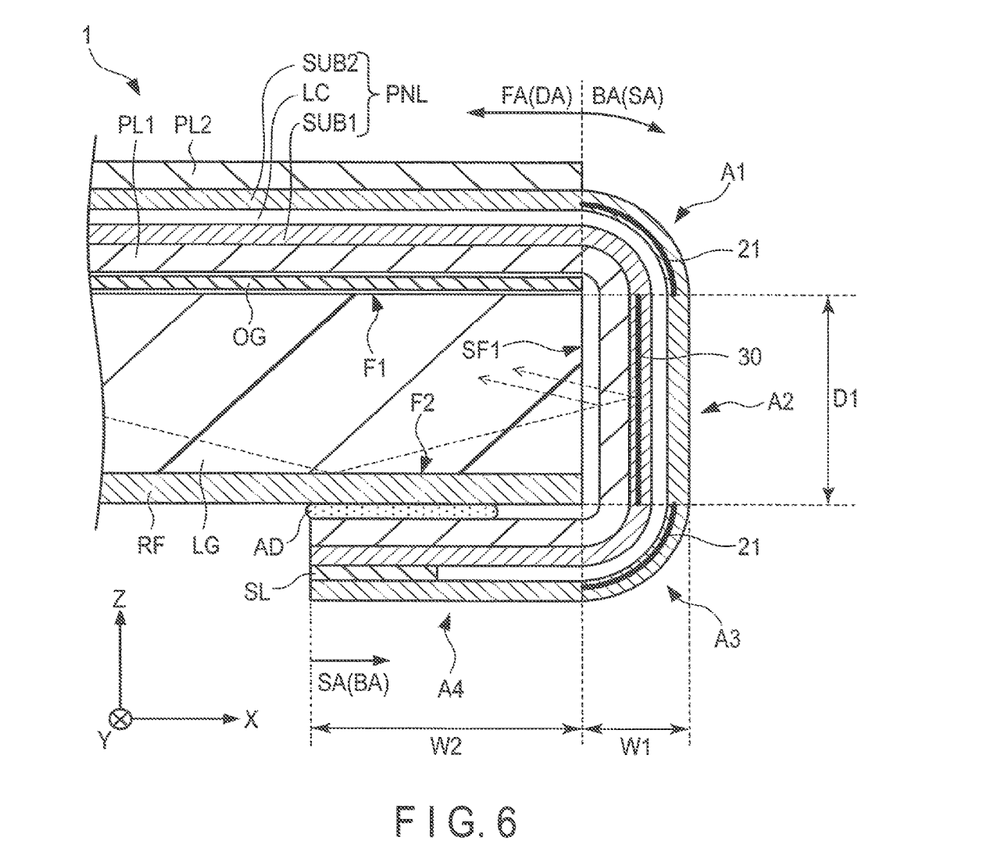
FIG. 6 is a schematic cross-sectional view showing a display device according to a third embodiment.

FIG. 6 is a schematic cross-sectional view showing the display device 1 according to a third embodiment. Attention is focused on a close vicinity to a first side surface SF1 of a light guide LG, similarly to FIG. 3.

In the example of FIG. 6, a second polarizer PL2 is not provided in a bent area BA, similarly to the second embodiment. However, the second polarizer PL2 may be provided in the bent area BA.

Furthermore, in the example shown in FIG. 6, a first substrate SUB1 includes a reflective layer 30 in a second area A2. The reflective layer 30 is desirably formed of a metal material having a high reflectivity and an excellent light-shielding property. For example, aluminum alone or an aluminum alloy can be used as the metal material.

For example, in the same layer as the metal layer ML shown in FIG. 2, the reflective layer 30 can be formed of the same metal material as the metal layer ML. In this case, the reflective layer 30 can be formed in the same process as the metal layer ML.

Part of the light guided by the light guide LG and emitted from the first side surface SF1 is reflected on the first polarizer PL1 and made incident on the light guide LG again. The light which is not reflected on the first polarizer PL1 is transmitted through the first polarizer PL1, then reflected on the reflective layer 30, and made incident on the light guide LG again. Thus, according to the structure of the present embodiment, the efficiency of use of the light from the light source LS can be further increased since more light than the first embodiment can be returned to the light guide LG.

In the example shown in FIG. 6, a light-shielding layer 21 is disposed in a first area A1 and a third area A3, but is not disposed in a second area A2 or a fourth area A4. However, the light-shielding layer 21 may be disposed in second area A2 and the fourth area A4. In addition, the reflective layer 30 may also be disposed in the first area A1, the third area A3, and the fourth area A4.

The same structure as that in close vicinity to the first side surface SF1 as explained the present embodiment can also be applied to a close vicinity to a second side surface SF2, a third side surface SF3, and a fourth side surface SF4 of the light guide LG.

Fourth Embodiment

A fourth embodiment will be described. Constituent elements and effects that are not specifically referred to are the same as those in the first embodiment.

Figure 7:
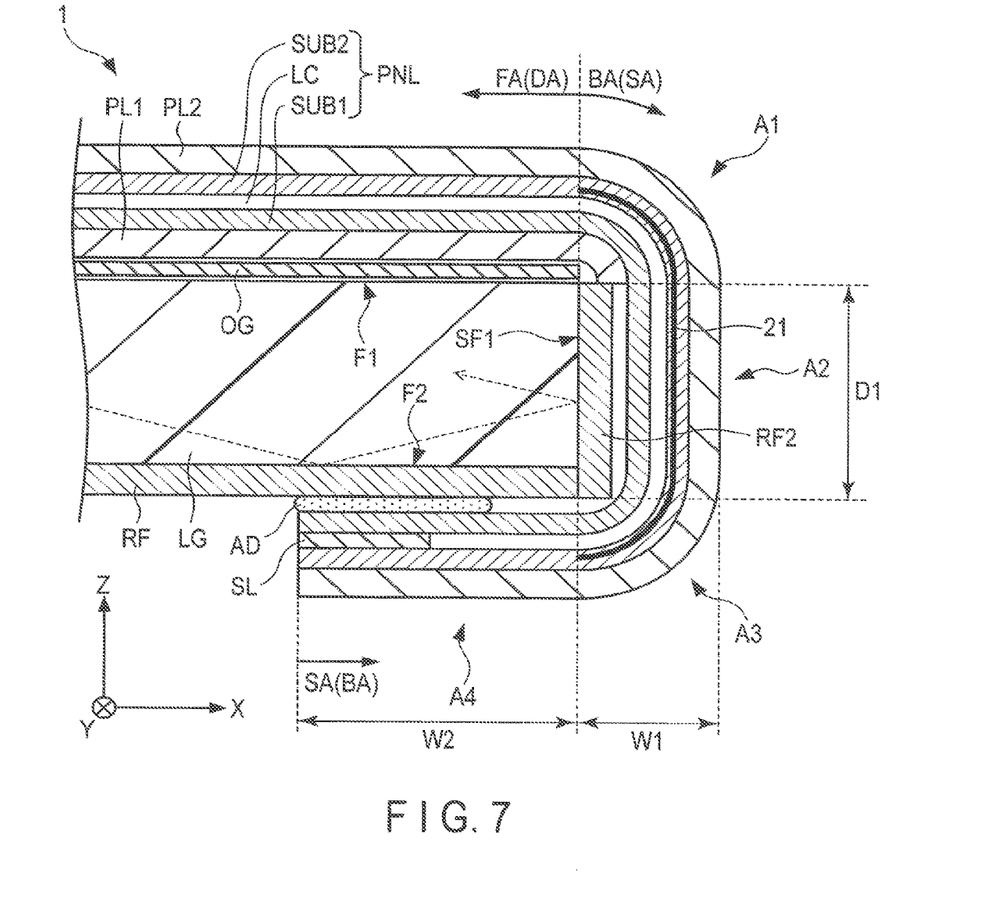
FIG. 7 is a schematic cross-sectional view showing a display device according to a fourth embodiment.

FIG. 7 is a schematic cross-sectional view showing a display device 1 according to the fourth embodiment. Attention is focused on a close vicinity to a first side surface SF1 of a light guide LG, similarly to FIG. 3.

In the example shown in FIG. 7, a first polarizer PL1 is provided in a flat area FA and a first area A1, but is not provided in a second area A2, a third area A3, and a fourth area A4. However, the first polarizer PL1 may not be provided in the first area A1 or may be provided in a whole body of a bent area BA similarly to each of the above-explained embodiments.

In addition, in the example shown in FIG. 7, a second polarizer PL2 is provided in the whole body of the bent area BA. That is, positions of end portions of the first polarizer PL1 and the second polarizer PL2 coincide with each other. However, the second polarizer PL2 may not be provided in the bent area BA similarly to the second embodiment.

The display device 1 comprises not only a reflective member RF which covers a second main surface F2 of a light guide LG, but also a reflective member RF2 which faces a first side surface SF1. For example, the reflective member RF2 is in close contact with the first side surface SF1. The reflective member RF2 is located between the first side surface SF1 and the display panel PNL, in the second area A2. The reflective member RF2 may be a member separated from the reflective member RF or may be integrated with the reflective member RF. For example, the reflective member RF2 includes a layer formed of a metal material having an excellent reflectivity such as silver or aluminum, similarly to the reflective member RF.

The light guided by the light guide LG and emitted from the first side surface SF1 is reflected on the reflective member RF2 and made incident on the light guide LG again. For example, the light emitted from the first side surface SF1 is rarely transmitted through the reflective member RF2. Even if part of the light is transmitted through the reflective member RF2, the light is absorbed into a light-shielding layer 21.

In the structure of the present embodiment, too, the frame of the display device 1 can be narrowed as compared with a case of providing the frame 200 similarly to the comparative example shown in FIG. 4. The reflective member RF2 can also be provided in close vicinity to the second side surface SF2 and the fourth side surface SF4, similarly to the present embodiment.

In the structure of the present embodiment, since the first polarizer PL1 is not provided in the second area A2, the third area A3, and the fourth area A4, the width w1 of the frame area (non-display area) is equivalent to the distance from the first main surface F1 of the light guide LG in the display area DA to the outer surface of the second polarizer PL2 even if the reflective member RF2 is provided between the light guide LG and the display panel PNL. If the thickness of the reflective member RF2 is set to be smaller than or equal to the thickness of the first polarizer PL1, the total of the thickness of the reflective member RF2 and the thickness of the display panel PNL in the bent area BA can be set to be smaller than or equal to the thickness of the display panel PNL in the display area DA.

All of the display devices that can be implemented by a person of ordinary skill in the art through arbitrary design changes to the display devices described above as embodiments of the present invention come within the scope of the present invention as long as they are in keeping with the spirit of the present invention.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A display device, comprising:
a light source;
a light guide including a first surface, a second surface opposed to the first surface, and a side surface connecting the first surface and the second surface, and allowing light from the light source to be emitted from the first surface;
a flexible display panel including a display area on which the light from the first surface is incident; and
a first polarizer between the light guide and the display panel,
wherein
the display panel is opposed to the first surface,
an end portion of the display panel is bent toward the second surface along the side surface, and
the first polarizer faces the side surface.

2. The display device of claim 1, wherein
the first polarizer comprises:
a first layer allowing a first polarization component of light to be transmitted and absorbing a second polarization component; and
a second layer disposed between the first layer and the side surface to allow the first polarization component of light from the side surface to be transmitted and to reflect the second polarization component.

3. The display device of claim 2, wherein
the display panel includes a light-shielding layer opposed to the side surface, in a bent area.

4. The display device of claim 3, further comprising:
a second polarizer,
wherein
the display panel is disposed between the first polarizer and the second polarizer, and
the second polarizer is bent along the side surface.

5. The display device of claim 3, further comprising:
a second polarizer,
wherein
the display panel is disposed between the first polarizer and the second polarizer, and
the second polarizer is not provided in an area where the display panel is bent.

6. The display device of claim 1, wherein
the display panel includes a reflective layer which reflects light from the side surface, in a bent area.

7. The display device of claim 6, wherein
the display panel comprises:
a switching element provided in each of pixels in the display area and including a semiconductor layer; and
a metal layer between the semiconductor layer and the light guide, and
the reflective layer is formed of a same material as the metal layer, in a same layer as the metal layer.

8. The display device of claim 3, wherein
the display panel and an end portion of the first polarizer are located on a side of the second surface.

9. The display device of claim 8, wherein
the display panel comprises:
a flexible first substrate;
a flexible second substrate opposed to the first substrate;
a frame-shaped sealing member which sticks the first substrate and the second substrate; and
a liquid crystal layer disposed in space surrounded by the first substrate, the second substrate, and the sealing member, and
the sealing member is located on a side of the second surface.

10. The display device of claim 8, further comprising:
a reflective member which covers the second surface,
wherein
the end portion of the first polarizer is bonded to the reflective member.

11. A display device, comprising:
a light source;
a light guide including a first surface, a second surface opposed to the first surface, and a side surface connecting the first surface and the second surface, and allowing light from the light source to be emitted from the first surface;
a flexible display panel including a display area on which the light from the first surface is incident; and
a reflective member facing the side surface,
wherein
the display panel is bent along the side surface,
the reflective member is located between the display panel and the side surface, in an area where the display panel is bent, and
a total of a thickness of the display panel and a thickness of the reflective member in the area where the display panel is bent is smaller than or equal to a thickness of the display panel in the display area.

12. The display device of claim 11, wherein
the reflective member is a reflective polarizer.

13. The display device of claim 12, wherein
the reflective polarizer comprises:
a first layer allowing a first polarization component of light to be transmitted and absorbing a second polarization component; and
a second layer disposed between the first layer and the side surface to allow the first polarization component of the light from the side surface to be transmitted and to reflect the second polarization component.

14. The display device of claim 11, wherein
the display panel includes a light-shielding layer opposed to the side surface, in a bent area.

15. The display device of claim 11, further comprising:
a first polarizer and a second polarizer,
wherein
the display panel is disposed between the first polarizer and the second polarizer, and
the second polarizer is bent along the side surface.

16. The display device of claim 11, further comprising:
a first polarizer and a second polarizer,
wherein
the display panel is disposed between the first polarizer and the second polarizer, and
the second polarizer is not provided in an area where the display panel is bent.

17. The display device of claim 11, wherein
an end portion of the display panel is located on a side of the second surface.

18. The display device of claim 11, wherein
the display panel comprises:
a flexible first substrate;
a flexible second substrate opposed to the first substrate;
a frame-shaped sealing member which sticks the first substrate and the second substrate; and
a liquid crystal layer disposed in space surrounded by the first substrate, the second substrate, and the sealing member, and
the sealing member is located on a side of the second surface.

19. The display device of claim 11, wherein the reflective member is in contact with the side surface.

20. The display device of claim 11, wherein the reflective member includes a layer formed of a metal material.

* * * * *